Figure 1:
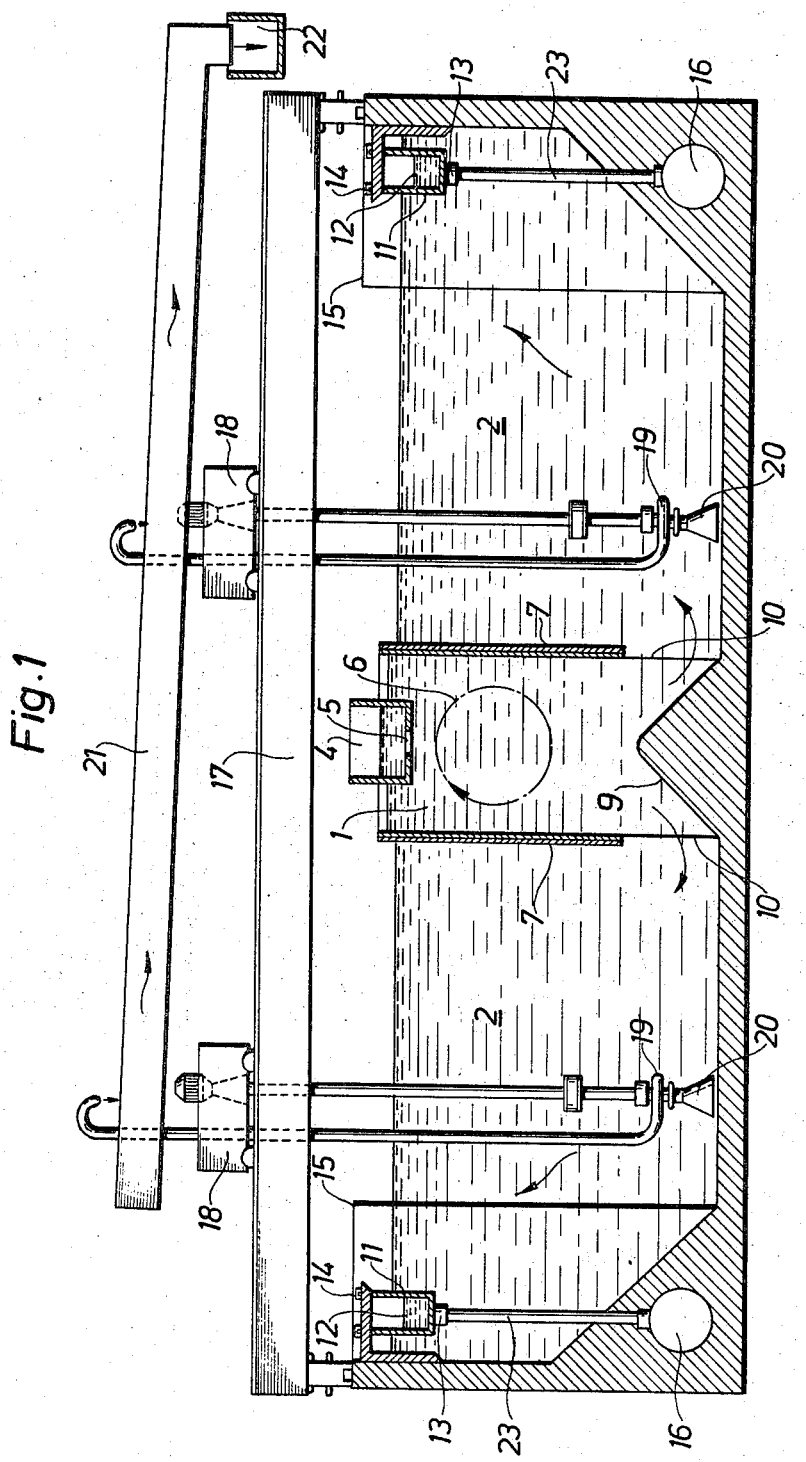

United States Patent [19]

Dunkers et al.

[11] 3,822,788
[45] July 9, 1974

[54] SEWAGE FLOCCULATING AND SEDIMENTATION TANK UNIT

[75] Inventors: Karl Ragnar Dunkers, Taby; Jarl Harald Johansson, Alvsjo, both of Sweden

[73] Assignee: Johnson Construction Company AB, Solna, Sweden

[22] Filed: Oct. 24, 1972

[21] Appl. No.: 299,947

[30] Foreign Application Priority Data
Nov. 1, 1971  Sweden............................ 13.902/71

[52] U.S. Cl.................. 210/200, 210/208, 210/221, 210/519, 210/527
[51] Int. Cl............................................. C02b 1/20
[58] Field of Search ........... 210/123, 208, 220, 221, 210/256, 525, 528, 200, 49, 51, 195, 219, 264, 405, 456, 519, 520, 521, 527

[56] References Cited
UNITED STATES PATENTS

| | | | |
|---|---|---|---|
| 2,185,785 | 1/1940 | Dorr et al. | 210/123 X |
| 2,685,825 | 8/1954 | Novak | 210/405 X |
| 2,772,781 | 12/1956 | Unthank | 210/519 X |
| 2,881,923 | 4/1959 | Nelson | 210/525 |
| 3,116,237 | 12/1963 | Fontein et al. | 210/123 X |
| 3,134,735 | 5/1964 | Greenleaf, Jr. | 210/264 |
| 3,236,384 | 2/1966 | Sontheimer et al. | 210/219 X |
| 3,307,702 | 3/1967 | MacKrle et al. | 210/519 X |
| 3,333,704 | 8/1967 | McGivern et al. | 210/527 X |
| 3,353,683 | 11/1967 | Geiger | 210/519 X |
| 3,362,538 | 1/1968 | Katz et al. | 210/208 |
| 3,618,773 | 11/1971 | Jacquet | 210/123 |
| 3,649,529 | 3/1972 | Walker | 210/195 X |
| 3,722,698 | 3/1973 | Hampton | 210/528 X |

FOREIGN PATENTS OR APPLICATIONS

| | | | |
|---|---|---|---|
| 434,795 | 10/1926 | Germany | 210/123 |

Primary Examiner—John Adee
Assistant Examiner—Robert H. Spitzer
Attorney, Agent, or Firm—Wigman & Cohen

[57] ABSTRACT

A rectangular tank for purifying domestic sewage and industrial sewage is disclosed. The tank comprises a flocculating section extending the length of the tank for introducing sewage therein, a sedimentation section in fluid communication with the flocculating section including an outlet weir at the upper portion of the sedimentation section. A plurality of compartments are formed in both the flocculating and sedimentation sections to substantially uniformly distribute the incoming sewage the length of the tank. Outlet means at the bottom of each of the flocculating sections opens into the sedimentation section to guide the sewage from the flocculating section in a direction substantially perpendicular to the longitudinal axis of the tank and upwardly towards the outlet weir for discharge as clarified water. Means for agitating the incoming sewage is provided in each of the flocculating compartments. The deposited sludge is collected and transported by a suction device.

9 Claims, 2 Drawing Figures

SEWAGE FLOCCULATING AND SEDIMENTATION TANK UNIT

The present invention relates to a combined sewage flocculating and sedimentation tank.

BACKGROUND OF THE INVENTION

One method often used for purifying domestic or sanitary sewage and industrial wastes is the chemical precipitation process, in which suitable chemicals (e.g., aluminium sulphate, lime, iron chloride, polyelectrolytes or combinations thereof) are added to the sewage and the sewage passed to one or more flocculating tanks - normally equipped with slowly rotating agitators or paddles - in which colloidal solids are formed into particles of size and weight that will settle. The colloidal solids or flocs are then separated from the liquid by being allowed to settle in subsequent settling tanks, whereafter the purified water is collected in a weir structure mounted at the surface of the water, while the sediment, consisting of flocs and sludge, is removed, normally by means of sludge scrapers and/or pumps. Certain industrial wastes or sewage has inherent flocculating tendencies, and thus it is unnecessary with such effluents to add flocculating chemicals since corresponding purifying effects can be obtained solely by agitating the liquid and allowing the resulting floc to settle.

For economic reasons, apparatus in which the flocculating or agitating step and the sedimentation step are effected are normally combined to form a single unit. These units are generally circular in shape, with the flocculating portion located in the centre thereof and the sedimentation portion arranged concentrically therearound. With this type of unit, the water is introduced into the centre thereof and distributed radially towards the periphery of the sedimentation portion. Depending on the manner in which the sewage is dispersed to the flocculating portion and to the sedimentation portion, and depending on the depth of water in the tanks, it is possible to obtain with such constructions either a substantially horizontal direction of flow or a vertical one. One feature common to circular units is that the sludge must be scraped along the bottom of the vessel, in towards the centre thereof, to be received in sludge collecting pockets.

Other well known constructions for corresponding sewage treatment processes have the form of rectangular tank units, in which the flocculation portion is either located on the long side of the sedimentation portion or on the short side thereof. One common feature with tanks of this type is that the sewage from the flocculating portion is passed to the sedimentation portion over the short side thereof, the rate of flow in the sedimentation portion being substantially dependent on the cross-sectional area of the sedimentation tank. Since with this type of construction the sewage inlet is arranged on the short side of the sedimentation portion, it is only possible to obtain a horizontal flow of the sewage.

The aforementioned known tank constructions are normally encumbered with different disadvantages from a process technical point of view. Thus, in the case of the circular type of tank, the inlet and sludge conduits must be placed beneath or embodied in the bottom of the tank, where they are particularly difficult to reach for cleaning and inspection purposes. Further, the free surfaces of the liquid in the sedimentation portion are exposed to the influence of the wind, which gives rise to uneven loads with subsequent reduction in purifying efficiency. Although these disadvantages are substantially eliminated with the known rectangular types of tanks, the fact that the sewage inlet is located on the short side thereof renders it difficult to obtain a vertically upward flow of the sewage. A vertical, upward flow of the sewage is desirable, since with vertical sedimentation it is possible to dimension the sedimentation portion of the tank to enable it to withstand considerably higher surface loads than with horizontal sedimentation, thereby enabling the total volume of the structure to be reduced. Further, the fact that the sewage intake is located on the short side of the rectangular tank causes the flow rate of the sewage - which also affects the sedimentation effect - to increase with the length of the tank as a result of the decrease in throughflow section.

The object of the present invention is therefore to provide a rectangular tank unit which eliminates the disadvantages associated with the above mentioned types of tanks. This object is achieved by means of the present invention, which is mainly characterized in that the flocculating portion and the sedimentation portion of the tank and the connection between said portions together with the outlet means of the sedimentation portion are so positioned that the flow of sewage through the sedimentation portion lies in a plane directed generally perpendicular to the longitudinal direction of the tank and, when viewed in section, obliquely upwards.

Figure 2:
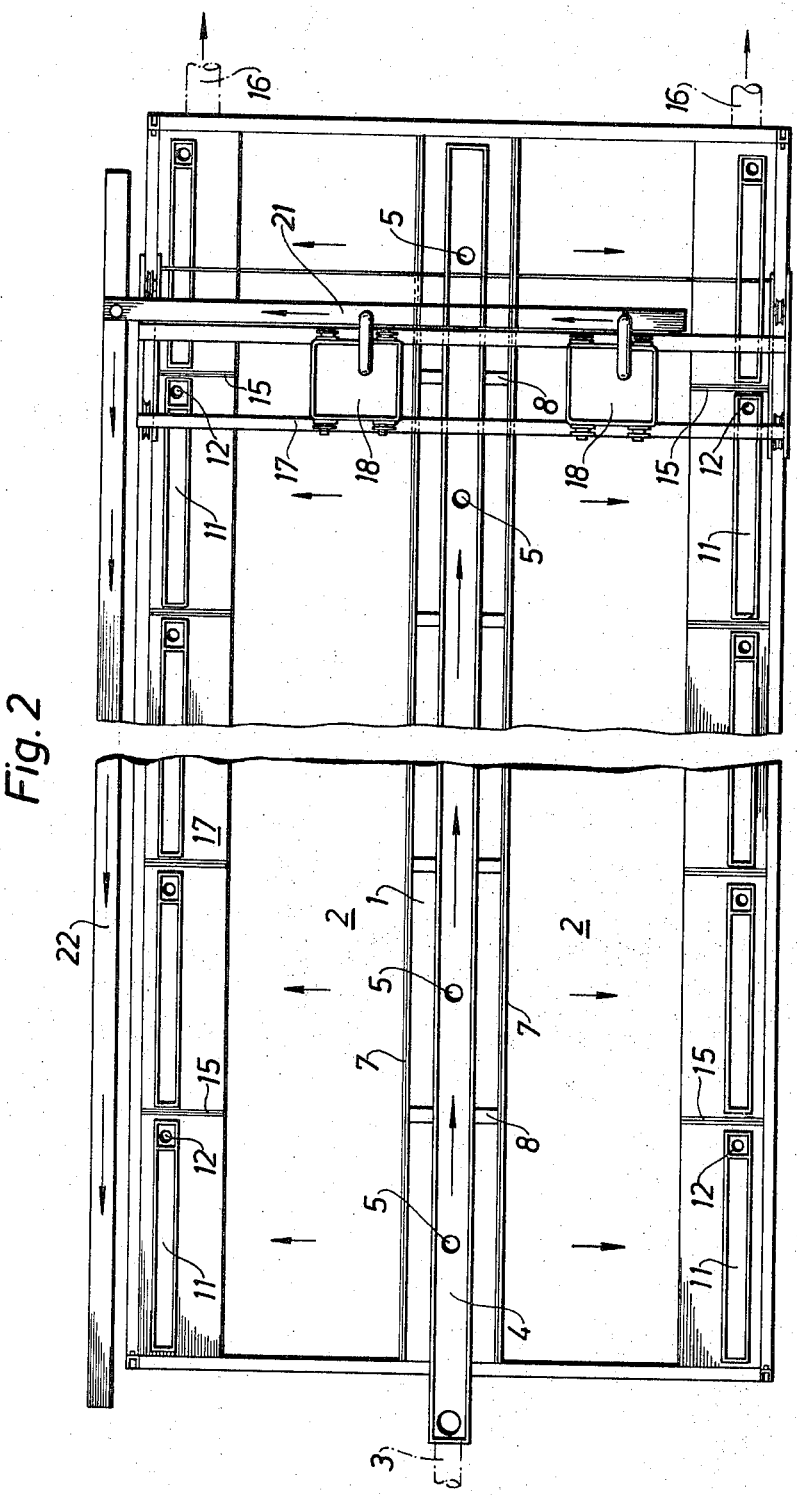

The invention will now be described with reference to an embodiment thereof illustrated in the accompanying drawings, in which FIG. 1 is an end view in section of a tank unit constructed in accordance with the invention, and FIG. 2 is a top plan view of the unit illustrated in FIG. 1.

The illustrated embodiment of the invention comprises a flocculating portion 1 and a sedimentation portion 2 combined to form a rectangular unit in which input conduits and sludge discharge conduits can be readily reached for checking and cleaning purposes, and in which hydraulic connection of the different compartments of the tank enables the sewage or industrial waste to be distributed over the whole length of the tank, which in turn enables a vertical direction of flow of the sewage to be obtained under hydraulically fully stable conditions. Moreover, since, in accordance with the invention, the throughflow section of the sedimentation portion takes up the length of said portion, the rate of flow of the liquid through the sedimentation portion is the lowest possible.

With the illustrated embodiment, sewage or industrial waste is passed through an inlet line 3 to an open inlet duct 4 extending over the whole length of the tank. When required, flocculation chemicals are added to the sewage prior to its entry into the inlet duct 4. Located in the duct 4 are bottom openings 5 through which the sewage is discharged to a number of flocculating chambers 1, in which the flocs grow and develop. The flocculating chambers are defined by transversal walls 8 and longitudinal walls 7 which terminate short of the bottom of the tank to leave an opening 10 facing the sedimentation portion 2. Each flocculation chamber 1 is provided with one or more slowly rotating agitating devices 6, the purpose of which is to provide effective mutual contact between the floc forming nucleants. The bottom portions of the flocculating chambers when seen in section have the form of a cone 9, which enables the material settled in the flocculating chamber to slide through the openings 10 into the adjacent sedimentation portion 2.

The flocculated sewage is passed through the openings 10 in a direction of flow obliquely upwards through the sedimentation portions 2 to outlet weirs 11 located at the surface of the liquid. The purified water is collected in the weirs 11 and passed to a second measuring weir structure 12 and a flexible connection 13 through riser conduits 23 to one or more central collecting conduits 16 mounted either within or externally of the tank space. The weirs 11 have a box like form having end walls and are contained lengthwise within compartments defined by guide screens 15. The weirs 11 are capable of being adjusted vertically by means of a number of suspension devices 14. Vertical adjustment of the weirs is normally effected when trimming the system, so that the flow of liquid over the measuring weir 12 is the same in all compartments on the outlet side. In this way, there is obtained uniform distribution of the flow of liquid from the flocculating portion to the sedimentation portion and uniform distribution of the flow from the inlet duct 4 through the openings 5 to the flocculating portion (or chambers) 1. For the purpose of collecting and pumping away sedimented material from the flat bottom portions of the tank, the tank is provided with a motor driven traverse sludge scraper 17, which is manually or automatically driven backwards and forwards in the longitudinal direction of the tank. Mounted on the traverse scraper 17 are transversally extending motor driven carriages 18, which are manually or automatically driven in the cross direction of the tank. Located on the carriages 18 are sludge pumps 19 which pump sedimented material from the tank bottom through suction tubes 20 to a sludge duct 21 mounted on the traverse scraper 17. The thus removed sludge is then passed under the influence of gravity to an outlet duct 22 arranged adjacent the tank. Owing to the reciprocating movement of the traverse 17, the inlet duct 4 can be kept clean from blockages, by causing a scraper (not shown) mounted on the traverse to scrape the bottom of the duct continuously.

Although the invention has been described with reference to one embodiment thereof, it is not restricted thereto, but can be modified within the scope of the following claims.

For example, the flocculating portion 1 and the inlet chute 4 of the tank unit can be located on one long side of the unit.

The volume and area of the flocculating and sedimentation portions of the tank unit are varied from case to case according to existing loading conditions. The tank unit can be expanded either by extending the tank in its longitudinal direction with the required number of additional compartments, or by arranging the required number of additional tank units in side by side relationship.

We claim:

1. A rectangular tank for purifying domestic sewage and industrial waste, comprising a flocculating section and a sedimentation section having an outlet and a fluid connection therebetween, said flocculating section and sedimentation section and said connection therebetween being positioned so that the flow of sewage from said flocculating section to said sedimentation section outlet, as seen in plan view, is directed substantially perpendicular to the longitudinal direction of the tank and, as seen in vertical section, obliquely upwards, each of said flocculating section and said sedimentation section being divided into a plurality of aligned compartments by transversally extending guide walls for substantially uniformly distributing the sewage over the tank in the longitudinal direction thereof, said plurality of aligned flocculating compartments extending the longitudinal length of said tank, said sedimentation compartments confronting opposite sides of said flocculating section in fluid communication therewith.

2. A tank according to claim 1, wherein said compartment on the outlet side of the sedimentation portion is provided with a vertically adjustable weir.

3. A tank according to claim 1, including sludge conveying means common to all compartments for collecting and transporting separated sediment.

4. Apparatus for purifying sewage and industrial wastes comprising:
a substantially rectangular tank, when viewed in plan, including a flocculating section, and a sedimentation section, said flocculating and sedimentation sections extending substantially the length of said tank in fluid communication relationship;
said flocculating section including inlet sewage conduit distribution means in the vicinity of the upper portion of said tank for substantially uniformly distributing sewage along the length of said flocculating section, outlet means in the vicinity of the lower portion of said tank for directing sewage from the flocculating section into the sedimentation section in a substantially perpendicular flow with respect to the longitudinal axis of said tank;
said sedimentation section including weir means in the vicinity of the upper portion of said tank for receiving clarified water from said sedimentation section;
said flocculating section outlet and said sedimentation section weir being constructed and arranged to effect a flow pattern from the flocculating section outlet to the sedimentation section weir which is generally obliquely upward so as to provide improved sludge precipitation;
said flocculating section being divided into a plurality of longitudinally adjacent compartments, said sedimentation section outlet also being divided into a plurality of compartments in aligned relationship with said flocculating section compartments.

5. The apparatus according to claim 4, wherein each of said flocculating section compartments is fed from an inlet conduit having an opening in fluid communication with said flocculating section compartment, each of said flocculating section compartments further including means for agitating incoming raw sewage.

6. The apparatus according to claim 5, wherein said tank includes scraping means for cleaning said opening in said inlet conduit to each of said compartments, said cleaning means being movably positioned in transverse orientation with respect to the longitudinal axis of said tank and capable of being moved longitudinally in operable contact with said flocculating section inlet conduit.

7. The apparatus according to claim 4, wherein the lower portion of said flocculating section terminates adjacent the tank bottom wall, and a conically shaped portion extending upwardly into said flocculating section adjacent said flocculating section outlet.

8. The apparatus according to claim 4, wherein a sedimentation section is provided on both sides of the longitudinally extending flocculating section, said flocculating section including outlet means confronting each of said oppositely positioned sedimentation sections.

9. The apparatus according to claim 4, further including movable bridge means positioned transversely with respect to the longitudinal axis of said tank, said bridge means carrying independently movable sludge collection means extending into said sedimentation section adjacent the bottom portion of the tank.

* * * * *